United States Patent [19]

Chambers et al.

[11] Patent Number: 4,810,268

[45] Date of Patent: Mar. 7, 1989

[54] APPARATUS AND METHOD OF WASHING AIR

[75] Inventors: John E. Chambers, Greenville; John D. Joye, Mauldin, both of S.C.

[73] Assignee: PPG Industries, Inc., Pittsburgh, Pa.

[21] Appl. No.: 83,923

[22] Filed: Aug. 3, 1987

Related U.S. Application Data

[63] Continuation of Ser. No. 795,761, Nov. 7, 1985, abandoned.

[51] Int. Cl.$^4$ .............................................. B01D 47/06
[52] U.S. Cl. ......................................... 55/84; 55/89; 55/94; 55/235; 55/257.1; 261/30; 261/79.2; 261/116; 261/118
[58] Field of Search ................. 261/30, 79.2, 115-118, 261/DIG. 9, DIG. 75; 55/84, 89, 94, 235, 237, 238, 229, 257 R, 260, 440, 257 PV

[56] References Cited

U.S. PATENT DOCUMENTS

| | | |
|---|---|---|
| 1,639,179 | 8/1927 | Hamel ............................ 261/116 X |
| 1,993,498 | 3/1935 | Winterfield et al. ........... 261/116 X |
| 2,311,155 | 2/1943 | Carr ...................................... 261/30 |
| 2,593,548 | 4/1952 | Edwards ....................... 261/118 X |
| 3,206,177 | 9/1965 | Caplow .............................. 261/30 |
| 3,276,189 | 10/1966 | Sylvan ......................... 261/79 A X |
| 3,372,530 | 3/1968 | Zimmer ........................ 261/116 X |
| 3,691,733 | 9/1972 | Stockford ...................... 55/257 PV |
| 3,789,585 | 2/1974 | Arnold et al. ................. 261/118 X |
| 3,800,513 | 4/1974 | Lappin et al. ............... 261/79 A X |
| 3,841,063 | 10/1974 | Absher et al. ................ 261/118 X |
| 3,864,110 | 2/1975 | Wyman et al. ..................... 55/440 |
| 3,948,608 | 4/1976 | Weir, Jr. ........................ 261/118 X |
| 4,015,958 | 4/1977 | Leschonski et al. ......... 261/79 A X |
| 4,443,387 | 4/1984 | Gordon ........................ 261/79 A X |

Primary Examiner—Richard L. Chiesa
Attorney, Agent, or Firm—Bailey & Hardaway

[57] ABSTRACT

An apparatus and method of washing air is illustrated wherein a plurality of circumferentially spaced nozzles are positioned for directing a wash water spray across an air flow generated by a fan positioned at the entrance end of a housing for pushing air through the spray and an eliminator section.

10 Claims, 3 Drawing Sheets

APPARATUS AND METHOD OF WASHING AIR

This application is a continuation of Chambers, et al. Ser. No. 06/795,761, filed Nov. 7, 1985, now abandoned.

BACKGROUND OF THE INVENTION

Apparatus and method of washing air are often constructed so that spray headers are positioned within an air washer housing directing the spray from the nozzles in a direction opposed to the air flow. In other instances the array of nozzles in the spray system may have some of the nozzles arranged to direct the spray in the direction of air flow, opposed to other nozzles in the system. In the case of the Rotaspray air washer supplied by the Carrier Corporation, the nozzles direct spray in a direction opposed to air flow. While the air flow is pushed through the housing in the Rotaspray device, air is usually pulled through the unit by a fan located at the exit end of an air washer. Regardless of whether the direction of the spray is opposed to or in the direction of the air flow, the pipes and headers serving the nozzles of the prior art systems are located within the housing.

In such prior arrangements the pipes, headers and nozzles create resistance to air flow. This is because the spray system generally extends across the air flow path presenting a substantial surface area as an obstruction to air flow in order to assure coverage of the air stream to achieve uniform washing action. Such an obstruction creates turbulence as well as opposition to air flow resulting in a substantial pressure drop in the air washer.

Accordingly, it is an important object of this invention to provide improved economy and higher efficiency with reduced pressure drop from one end of the washer to the other.

SUMMARY OF THE INVENTION

It has been found that such improved results may be achieved through the use of air flow through the washer which is pushed from the entrance end through a spray section and then through an eliminator section wherein the spray section minimizes the disposition of obstructing surfaces within the air stream while providing a curtain of air extending across or substantially transversely of the housing. This construction and method along with proper nozzle arrangement provide reduced pressure drop with improved, more thorough washing. Such results may be still further improved through the use of a swirling air flow path wherein air is pushed from the entrance end of the housing past a structural member imparting a swirling action to the air flow preparatory to washing and the removal of liquid through the use of an eliminator section and the like.

BRIEF DESCRIPTION OF THE DRAWINGS

The construction designed to carry out the invention will be hereinafter described, together with other features thereof.

The invention will be more readily understood from a reading of the following specification and by reference to the accompanying drawings forming a part thereof, wherein an example of the invention is shown and wherein.

DESCRIPTION OF A PREFERRED EMBODIMENT

The drawings illustrate an air washer having a fan A at an air entrance end of an elongated housing providing a pushed through air flow in the housing, a supply of pumped wash water B for the housing, and an eliminator section C carried at an exit end of the housing. A wash water spray system includes a plurality of circumferentially spaced nozzles D Means E is provided for positioning the nozzles for directing a spray across said housing in a curtain extending across the air flow. The means E positioning the nozzles includes arcuate nozzle mounting means receiving the nozzles positioned generally transversely of the housing intermediate the fan and the eliminator section, and means connecting the arcuate mounting means to the supply of pumped wash water. Thus, there is a minimized pressure drop in the air flow due to reduced obstruction to air flow resulting from the arcuate nozzle mounting means with improved air washing capabilities.

Figure 1:
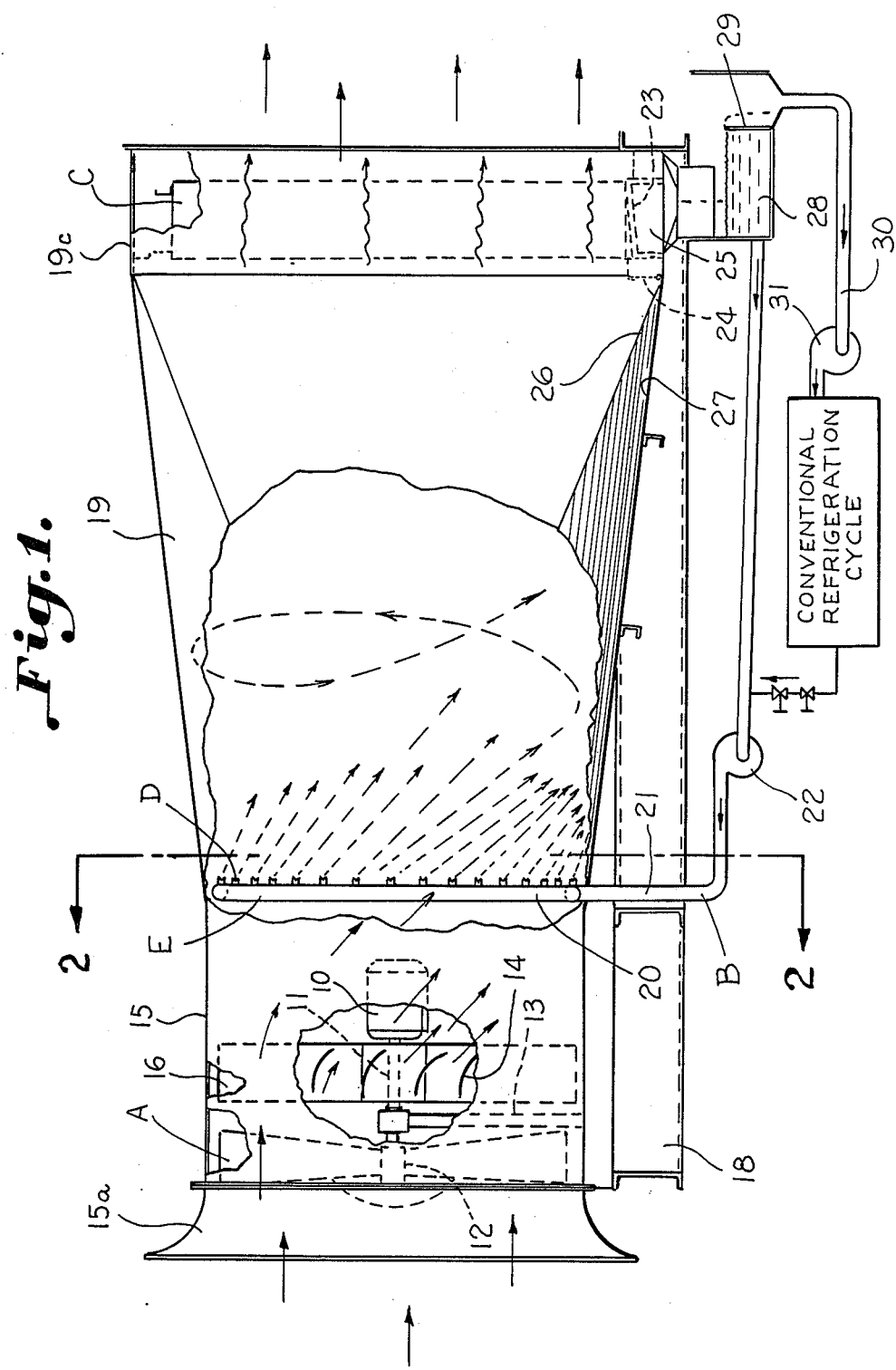
FIG. 1 is a side elevation schematically illustrating an air washer constructed in accordance with the present invention utilizing an arcuate pipe with radial inwardly directed nozzles to provide uniformity of washing with fins or vanes producing a swirling air flow.
Figure 4:
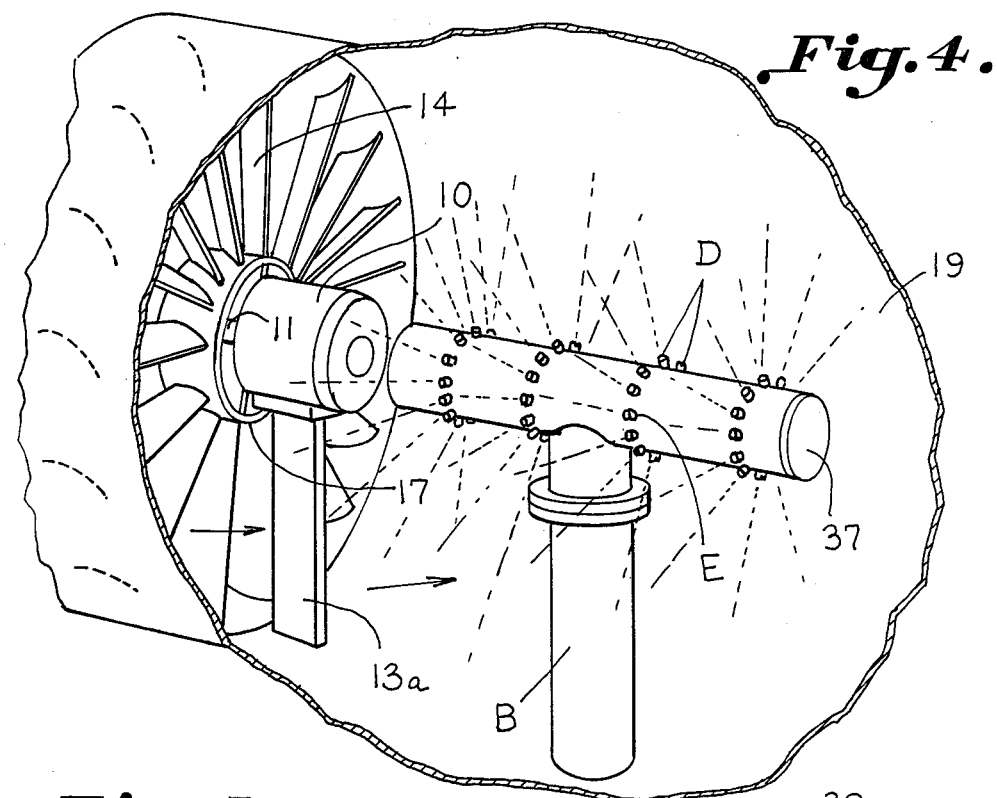
FIG. 4 is a perspective view illustrating a still further modified form of the invention illustrating the use of an axial header with circumferentially spaced radial nozzles.

The fan A is illustrated as having a series of propeller like blades or centrifugal fan and being driven by a motor 10 through a shaft 11 which carries the hub 12 of the fan. The shaft 11 is provided with a support 13. A stationary set of fins, vanes or blades 14 is carried between the support for the fan 13 and a motor support 13a (FIGS. 1 and 4). The vanes 14 are concave as illustrated in the drawings and arranged radially in such a fashion as to impart a swirling motion to the air entering the housing of the air washer. The housing has entrance section 15, provided with a ball 15a, which supports the frame 16 for positioning the concave blades which extend radially from a central hub 17 to the outer frame member 16. The housing is provided with a structural base 18 and utilizes a round to square section 19 which at its entrance carries the circumferentially spaced nozzles D.

Figure 2:
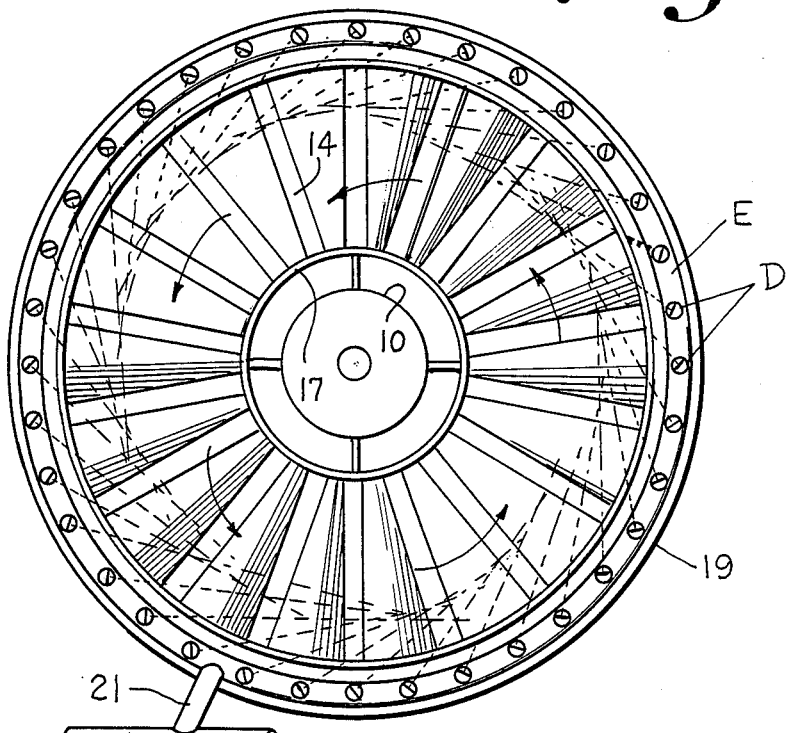
FIG. 2 is a transverse sectional elevation taken on the line 2—2 in FIG. 1.

Referring more particularly to FIGS. 1 and 2 will be observed that the means E for positioning the nozzles D is provided in the form of an annular pipe 20 having a connection with a supply of pumped wash water B provided through a pipe connection 21 which has connection to a pump 22.

It will be observed that the nozzles are positioned to direct a curtain of air generally across the air flow and preferably in a swirling motion. A bank of nozzles D may advantageously include 36 nozzles (not shown) on center lines spaced 10 degrees apart with 24 of these nozzles on 25 degrees to the radial and at a 30 degree plane in the direction of air flow. Eight of the nozzles are directed on radial lines to the center in a transverse plane, and the remaining four nozzles may be disposed in the transverse plane on 25 degrees to the radial. The eliminator section C (FIG. 1) may be provided as illustrated in U.S. Pat. No. 3,864,110 and is carried in an elevated position on a support 23. A depending flap 24 serves to close off the space 25 beneath the support 23 in order to impound water at a level 26 to block off any flow of air which would bypass the eliminator section C. When a predetermined water level is reached, the flap is displaced permitting water to flow down the inclined bottom 27 of a housing into a reservoir 28 which has a weir 29 for overflow water to pass through a pipe 30 to a pump 31 and a conventional refrigeration cycle from which the water serves as part of the supply B which is afforded through the pipes 21 to the nozzles. The eliminator is carried in a square section 19a of the housing.

By utilizing the structure illustrated in FIGS. 1 and 2, it has been found that even when the fan is not in use a pumping action occurs as a result of the angular position of the nozzles in the bank of nozzles particularly described. The swirling action and the resulting pumping action causes air to be drawn in to the entrance of the housing. Thus, the action of the spray arrangement actually tends to reduce the pressure drop across the housing.

Figure 3:
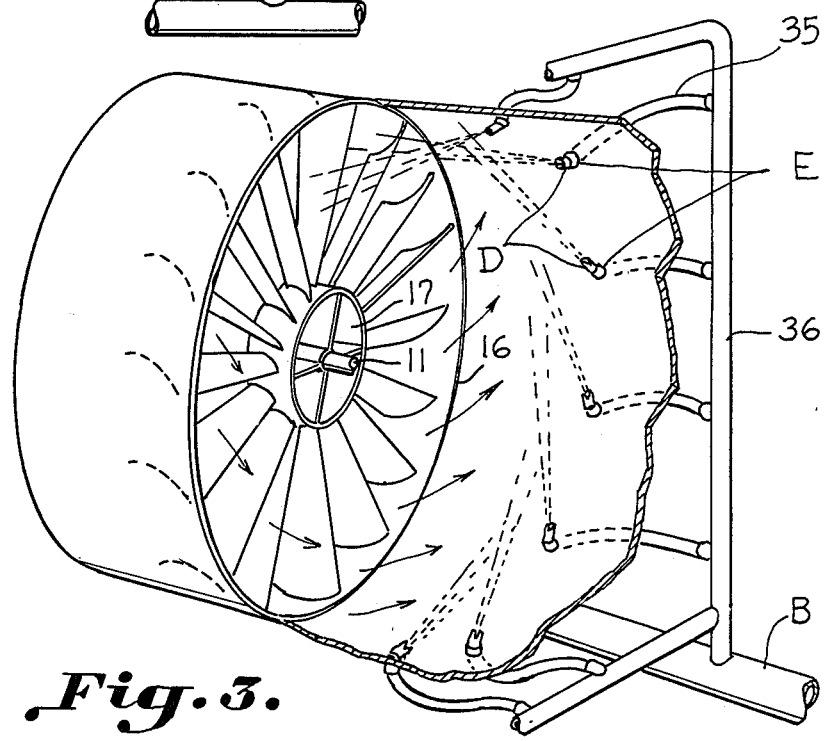
FIG. 3 is a perspective view illustrating the modified form of the invention utilizing circumferentially spaced inclined nozzles carried by the housing to create a swirling action across the housing.

Referring now to FIG. 3, it will be observed that the nozzles D are inclined on an angle to the radial and extend in a circumferentially spaced arrangement from the housing, a portion of which is illustrated as at D and E serving as a mounting for the nozzles. The nozzles are illustrated as being connected through the lines 35 to externally positioned headers 36. The header has connection with a source of pumped wash water B.

FIG. 4 illustrates a modified form of the invention wherein an annular header 37 is actually positioned within the housing to serve as an arcuate support E for mounting the nozzles D in circumferentially spaced arrangements within a number of longitudinally spaced rows. Each of these rows projects a curtain of spray which extends across the air flow path. The header 37 has direct connection with a source of pumped wash water B.

Figure 5:
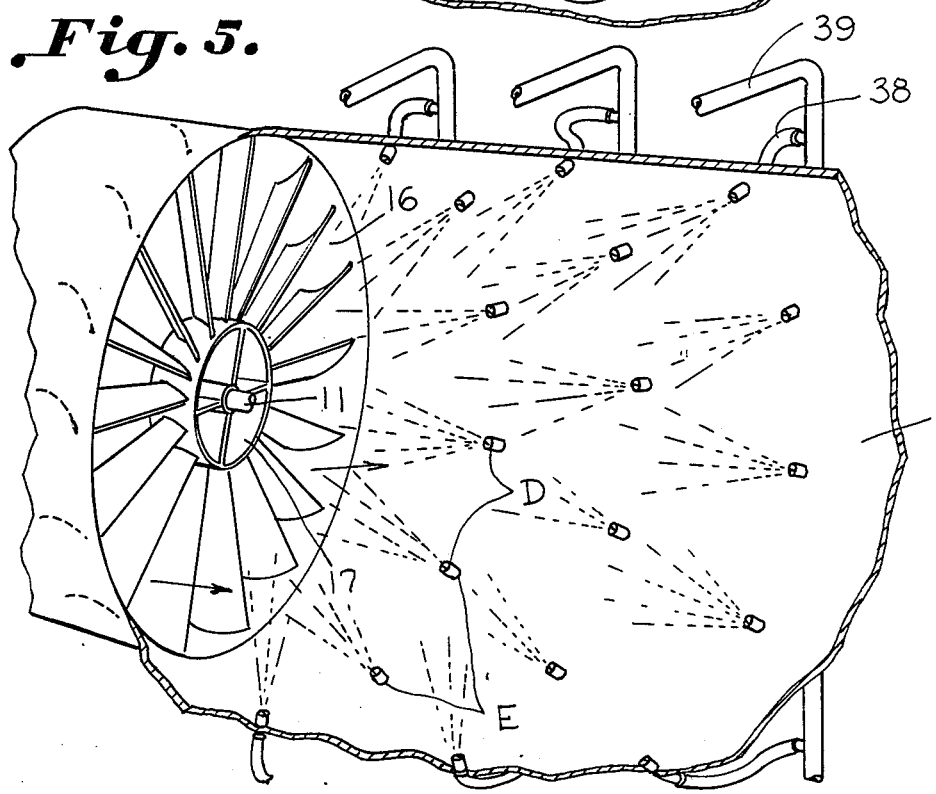
FIG. 5 is a perspective view of a modified form of the invention, similar to FIG. 4, illustrating the use of multiple rows of inwardly directed nozzles.

Referring now to FIG. 5, it will be observed that the housing acts as a support for a number of longitudinally spaced rows of radially extending nozzles. The nozzles D in FIG. 5 are directed in a transverse plane toward the longitudinally axis of the housing. Each of the nozzles is connected through the line 38 to an external header 39.

It is thus seen that an air washer has been provided which affords a more thorough washing action while at the same time reducing the power consumption of the air washing apparatus. By swirling the surface area of the portions of the spray apparatus which are external of the housing, the obstruction to air flow is reduced minimizing pressure drop by producing a swirling motion to the air flow so pressure drop is further reduced and the working qualities enhanced.

While a preferred embodiment of the invention has been described using specific terms, such description is for illustrative purposes only and it is to be understood that changes and variations may be made without departing from the spirit or scope of the following claims.

What is claimed is:

1. In an air washer having a fan at an air entrance end of an elongated imperforate housing having a portion of substantially circular cross section providing a pushed through air flow in said housing, a supply of pumped wash water for said housing, and an eliminator section carried at an exit end of said housing, a wash water spray system comprising:
    a plurality of circumferentially spaced nozzles for directing a spray across said housing in a curtain extending across said air flow;
    arcuate nozzle mounting means receiving said nozzle positioned generally transversely of said housing intermediate said fan and said eliminator section;
    said nozzles being positioned transversely to the longitudinal axis of said housing at an angle to the radius toward a downstream direction to direct spray in a longitudinal component along said housing toward said eliminator and in a component inwardly across said housing so that the disposition of hte nozzles causes the spray to act as a driving force pumping air and water in a swirling motion;
    means connecting said arcuate mounting means to said supply of pumped wash water; and
    said housing between said fan and said eliminator section being substantially free of obstruction;
    whereby there is higher efficiency and thus improved economy from a minimized pressure drop in air flow due to reduced obstruction to air flow resulting from the arcuate nozzle mounting means with improved air washing capabilities and greater heat transfer due to increased water to air contact resulting from greater distance of travel of the spray.

2. The structure set forth in claim 1 wherein said arcuate mounting means is an annular ring.

3. The structure set forth in claim 1 wherein a portion of said housing expands in cross-section during passage of air and water through said passageway.

4. The structure set forth in claim 1 wherein said arcuate nozzle mounting means are carried closely adjacent an inner circumferential portion of said housing.

5. The structure set forth in claim 4 wherein said arcuate nozzle mounting means is an annular ring.

6. The structure set forth in claim 4 wherein said arcuate nozzle mounting means receives the nozzles in said housing.

7. An air washer comprising:
    an elongated imperforate housing having a substantially circular cross section;
    a fan at an air entrance end of said housing providing a pushed through air flow in said housing;
    a supply of pumped wash water for said housing;
    an eliminator section carried at an exit end of said housing;
    a plurality of circumferentially spaced nozzles;
    means positioning said nozzles for directing a spray across said housing in a curtain extending across said air flow;
    said means positioning said nozzles including,
    arcuate nozzle mounting means receiving said nozzles carried generally transversely of said housing intermediate said fan and said eliminator section;
    said housing between said fan and said eliminator section being substantially free of obstruction;
    a plurality of vanes extending radially from an axial position across said housing carried intermediate said fan and said arcuate mounting means imparting a swirling motion to said air flow and wash water in said housing;
    whereby there is higher efficiency and thus improved economy from a minimized pressure drop in air flow due to reduce obstruction to air flow resulting from the arcuate nozzle mounting means with improved air washing capabilities.

8. The structure set forth in claim 7 wherein said vanes are adjustable in pitch to vary the swirl imparted to the air and spray.

9. The structure set forth in claim 7 wherein said housing expands in volume from entrance end to exit end.

10. The method of washing air comprising the steps of:
   pushing air through an elongated imperforate and substantially unobstructed housing of substantially circular cross-section creating an air flow path in said housing;
   directing pumped wash water in a spray across said air flow path by directing nozzles transversely to the longitudinal axis of said housing at an angle to the radius toward a downstream direction from a position adjacent an inner surface of said housing directing spray at an angle to the radial and at an angle directed to the exit end of said housing causing the air and sprayed water to be pumped through the housing and to swirl in said angle to the radial and to flow towards the exit end; and
   then subjecting said air flow to the action of an eliminator for removal of water;
   whereby the pressure drop in the air passing through the housing is reduced resulting in higher efficiency and improved washing is achieved as well as greater heat transfer due to increased water to air contact resulting from greater distance of travel of the spray.

* * * * *